(12) United States Patent
Agrawal et al.

(10) Patent No.: US 7,249,141 B2
(45) Date of Patent: Jul. 24, 2007

(54) AUTOMATED LAYOUT OF RELATIONAL DATABASES

(75) Inventors: Sanjay Agrawal, Kirkland, WA (US);
Surajit Chaudhuri, Redmond, WA (US); Abhinandan Das, Ithaca, NY (US); Vivek Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 10/426,235

(22) Filed: Apr. 30, 2003

(65) Prior Publication Data

US 2004/0220942 A1 Nov. 4, 2004

(51) Int. Cl.
*G06F 17/30* (2006.01)
*G06F 7/00* (2006.01)

(52) U.S. Cl. .................... 707/102; 707/3; 707/2

(58) Field of Classification Search ............. 707/200, 707/3, 100, 102, 2
See application file for complete search history.

(56) References Cited

U.S. PATENT DOCUMENTS

2003/0093442 A1\* 5/2003 Mogi et al. ............... 707/203

2003/0149698 A1\* 8/2003 Hoggatt .................... 707/100

OTHER PUBLICATIONS

Oracle9i Database Performance Tuning Guide and Reference, Release 2, Oct. 2002, Oracle®.\*
Performance Management Guide, AIX 5L Version 5.2, Fifth Edition, Oct. 2002, IBM.\*
Bakker, J.A., "Semantic Partitioning as a Basis for Parallel I/O in Database Management Systems", *Parallel Computing*, Oct. 2000, 26(11), 1491-1513.
Huh, M.Y., "An Efficient Scheme to Sequence File Structure for Data Base", *Journal of the Korea Information Science Society*, Oct. 1981, 8(3), 4-9.

\* cited by examiner

*Primary Examiner*—John Cottingham
*Assistant Examiner*—Kuen S. Lu
(74) *Attorney, Agent, or Firm*—Woodcock Washburn LLP

(57) ABSTRACT

Layout in a database system is performed using workload information. Execution information for a workload is obtained. Cumulative access and co-access information for database objects is then assembled. A cost model is developed for quantitatively capturing the value of different layouts, and a search is performed for a recommended database layout. In one embodiment, a greedy search is performed which initially attempts provide a layout that minimizes co-location of objects on storage objects, and then attempts to improve that layout via a greedy search.

48 Claims, 11 Drawing Sheets

AUTOMATED LAYOUT OF RELATIONAL DATABASES

FIELD OF THE INVENTION

This invention relates to relational database systems. More specifically, this invention relates to the placement of database objects in storage.

BACKGROUND OF THE INVENTION

Relational database systems (RDBMSs) are important tools for storing and retrieving information. As the size of a database increases, it becomes more difficult to achieve good overall performance for queries and updates to the database. One way to improve overall performance is to achieve good I/O performance. I/O performance may be improved using access methods such as indexes and materialized views.

RDBMSs can include database objects, such as tables, indexes, and materialized views, among others. Queries and updates which are performed on the database may access one or more of these database objects.

More than one storage location may exist for a database. For example, a number of disk drives may be available for storage of the database objects. Each storage location may be described with reference to certain characteristics, including: capacity (e.g. 8 GB), average seek time, average read transfer rate, and average write transfer rate.

Traditionally, RDBMS have relied on solutions that spread out each database object uniformly over all available disk drives. A typical solution is to use one or more disk drives, each of which may itself be an array of disks (e.g., a RAID (Redundant Arrays of Inexpensive Disks) array), and then use full striping, in which each database object is spread across all disk drives. Such a solution has the advantage that it is relatively easy to manage since the database administrator (DBA) does not have to be concerned about which disk drive(s) each object should be placed on.

SUMMARY OF THE INVENTION

While I/O parallelism may improve performance for queries and updates, an increased gain is achieved by informed layout of database objects. The workload for a database is used to calculate a layout that is appropriate for the workload faced by a database system, while satisfying manageability and availability requirements.

A cost model is developed for quantitatively capturing the tradeoff between the benefits of I/O parallelism and the costs of such parallelism for random I/O accesses for a given workload.

The invention utilizes information including a workload consisting of statements to be executed against the database and, optionally, a weight associated with each statement denoting the importance of the statement in the workload. A description of storage options (e.g. disk drives) and associated characteristics is also utilized. Optionally, manageability and availability constraints to be imposed are also utilized. A recommended layout is produced.

In one embodiment, first, a workload for the database system is analyzed, and execution information regarding how many blocks of each database object will be accessed, and which of such accesses can be co-accesses is obtained. Then, cumulative information over the entire workload of such accesses and co-accesses is generated. Finally, this cumulative information is used to select a database layout that describes a plan for how much of each database object should be located on each storage object.

BRIEF DESCRIPTION OF THE DRAWINGS

The foregoing summary, as well as the following detailed description of presently preferred embodiments, is better understood when read in conjunction with the appended drawings. For the purpose of illustrating the invention, there are shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
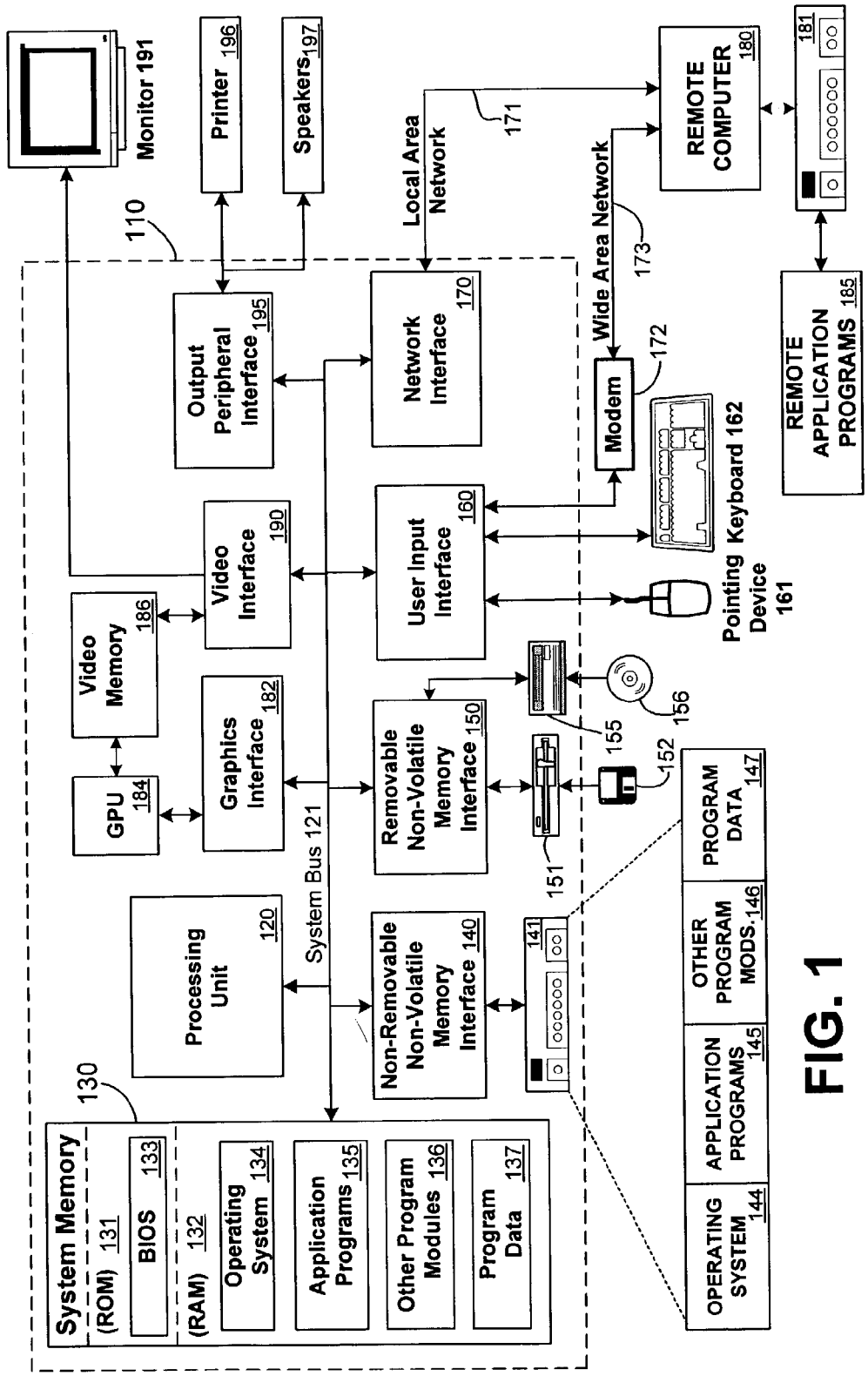
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer system 100. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to-the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The Database Layout Problem

A database layout describes the distribution of database objects over storage objects, for example, disk drives. While a database layout may be actually implemented for a database, a database layout simply may be a plan for the database, and may not be implemented. A database layout may include the equal distribution of a database object over a set of N disk drives; this is known as a full striping layout. A database layout may also assign more or less than 1/N of a database object to a specific disk drive. Generally, a database layout may be thought of as the assignment of each database object to a set of disk drives, along with a specification of the fraction of the object that is allocated to each disk drive. A valid database layout should also satisfy two constraints: (1) for each disk, the database layout does not assign more data to the disk than the disk can contain, and (2) each object is allocated in its entirety to one or more disks.

Figure 2:
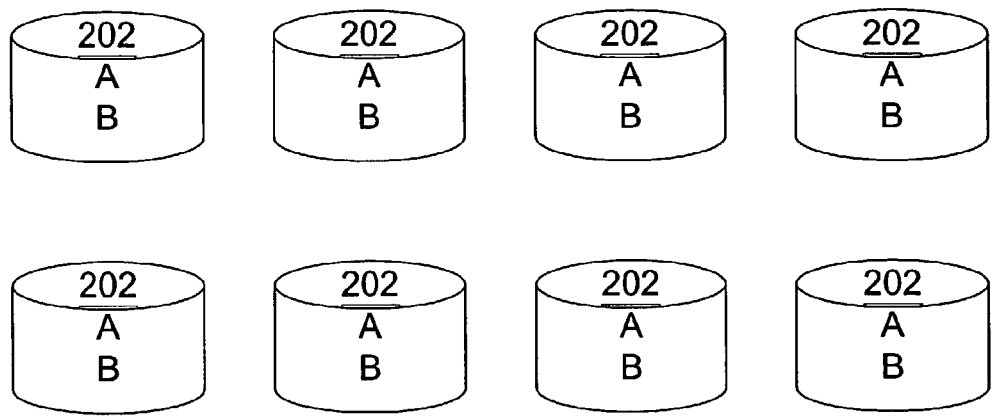
FIG. 2 is a block diagram of a group of storage objects on which two tables have been stored in a full striping layout.

As discussed, full striping is a database layout often selected to achieve I/O parallelism. The invention will be described with reference to disk drives; however, it is contemplated that any units of storage of data may be used according to the invention, particularly those where the cost for random access of stored data differs from the cost for sequential access of stored data. As shown in FIG. 2, two tables A and B are distributed uniformly over the eight disk drives 202. A portion of table A exists in each of the disk drives 202, and a portion of table B also exists in each of the disk drives 202. Thus, each of the tables is spread uniformly across the eight disk drives 202. This full striping layout may provide an I/O parallelism gain when accessing one of these tables.

Figure 3:
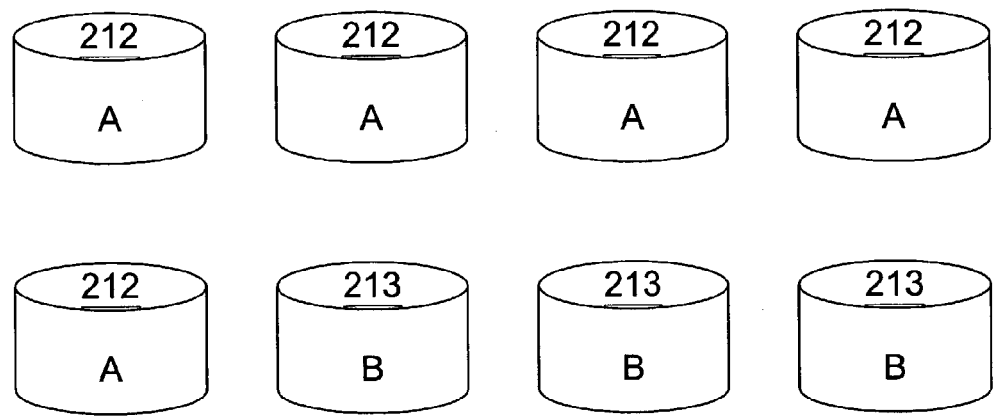
FIG. 3 is a block diagram of a group of storage objects on which two tables have been stored.

However, if a query which accesses each of these tables together (for example, a query which requires a Merge Join on the tables) is run, then this full striping layout may be less than optimal. Improved performance on such a query may be achieved with another layout of the tables on the available disk drives, because tables A and B may be co-accessed. In full striping, each drive contains a portion of table A and a portion of table B, and therefore when tables A and B are co-accessed, a seek cost may be involved. The seek cost reflects the time necessary for the disk drive to move from reading table A to table B. As shown in FIG. 3, the table A is uniformly distributed on five of the disk drives 212, and table B is uniformly distributed on three of the disk drives. Such a layout achieves improved performance over this query by allowing both tables to be accessed efficiently at once without a seek cost. Such co-access of the tables is possible because accessing each table involves a separate set of disk drives. The full striping shown in FIG. 2 therefore may not be the best layout, and in many cases performs worse at such a query than the layout shown in FIG. 3.

Thus, optimizing for I/O parallelism across all available disk drives clearly is not the best layout in all situations. When determining a good database layout, there is a tradeoff between benefits due to I/O parallelism and overhead due to random I/O accesses introduced by co-locating objects that are co-accessed during query executions. For workloads containing queries that co-access multiple objects, the gain in I/O performance by choosing an appropriate database layout other than full striping can be significant.

Other constraints may also be added to the problem of determining an advantageous layout, including manageability and availability constraints.

In RDBMSs, a filegroup (sometimes called a tablespace) is a collection of files that are present on one or more disk drives. Each database object can be assigned to exactly one filegroup, although it is possible to assign more than one object to a given filegroup. Filegroups are often used for manageability reasons as a unit of backup and restore. For example, an RDBMS may need to backup a set of frequently updated tables more often, and so this set of tables is assigned to a single filegroup. In such cases, a co-location constraint may be added to the definition of a valid layout. If two database objects are co-located, they are placed in the same filegroup, and are assigned to the same set of disk drives.

A second manageability requirement arises because new database objects or new disk drives may be added. In such a situation, an incremental solution is preferable, where a limited amount of change from an old layout to a new layout occurs. Therefore, when a new layout is being produced for a new scenario, a constraint limiting the total amount of data movement required for transforming the current database layout to the proposed layout may be considered.

Different disk drives may have different availability characteristics. Some disk drives are RAID 1 (Mirroring), others are RAID 5 (Parity), and still others are RAID 0 (no availability). In considering layouts, the DBA may want to specify an availability constraint that enforces a specific degree of availability for a database object. For example, it may be required that a particular critical table is stored in a drive with the Mirroring availability.

Producing a Database Layout Recommendation—Choosing and Analyzing Workload

Figure 4:
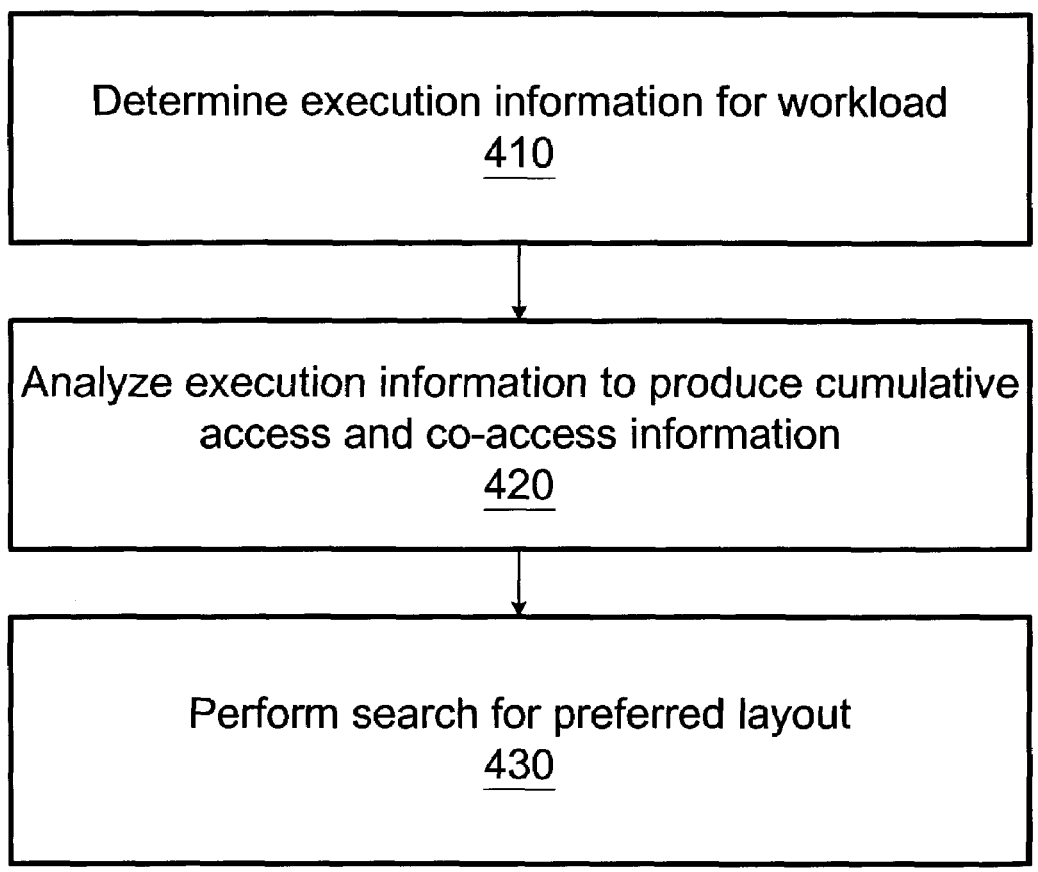
FIG. 4 is a flow diagram illustrating one embodiment of the invention.

In order to generate a database layout for a given database, according to the invention, a workload is analyzed for the database. In one embodiment, as seen in FIG. 4, in step 410, in order to produce a database layout recommendation, execution information is determined for a workload comprising at least one query. The workload consists of database statements that execute against the given database, such as Select, Insert, Update, and Delete statements. Execution information is information regarding how a database system might execute the statement. For example, execution information may comprise access information (regarding how much of each object is accessed for the query) and co-access information (regarding which accesses may be performed contemporaneously.) In one embodiment, execution plans are obtained for database statements (queries) in the workload chosen for use in providing a database layout recommendation. A historical workload of previously executed queries may be used. A workload may also be a testing workload may be used consisting of test queries, such as organizational benchmark queries or industry benchmarks, for example, the TPC Benchmark™H (TPC-H) from the Transaction Processing Performance Council. A workload may also be a a representative workload gathered using profiler tools from historical and/or other workloads.

Figure 5:
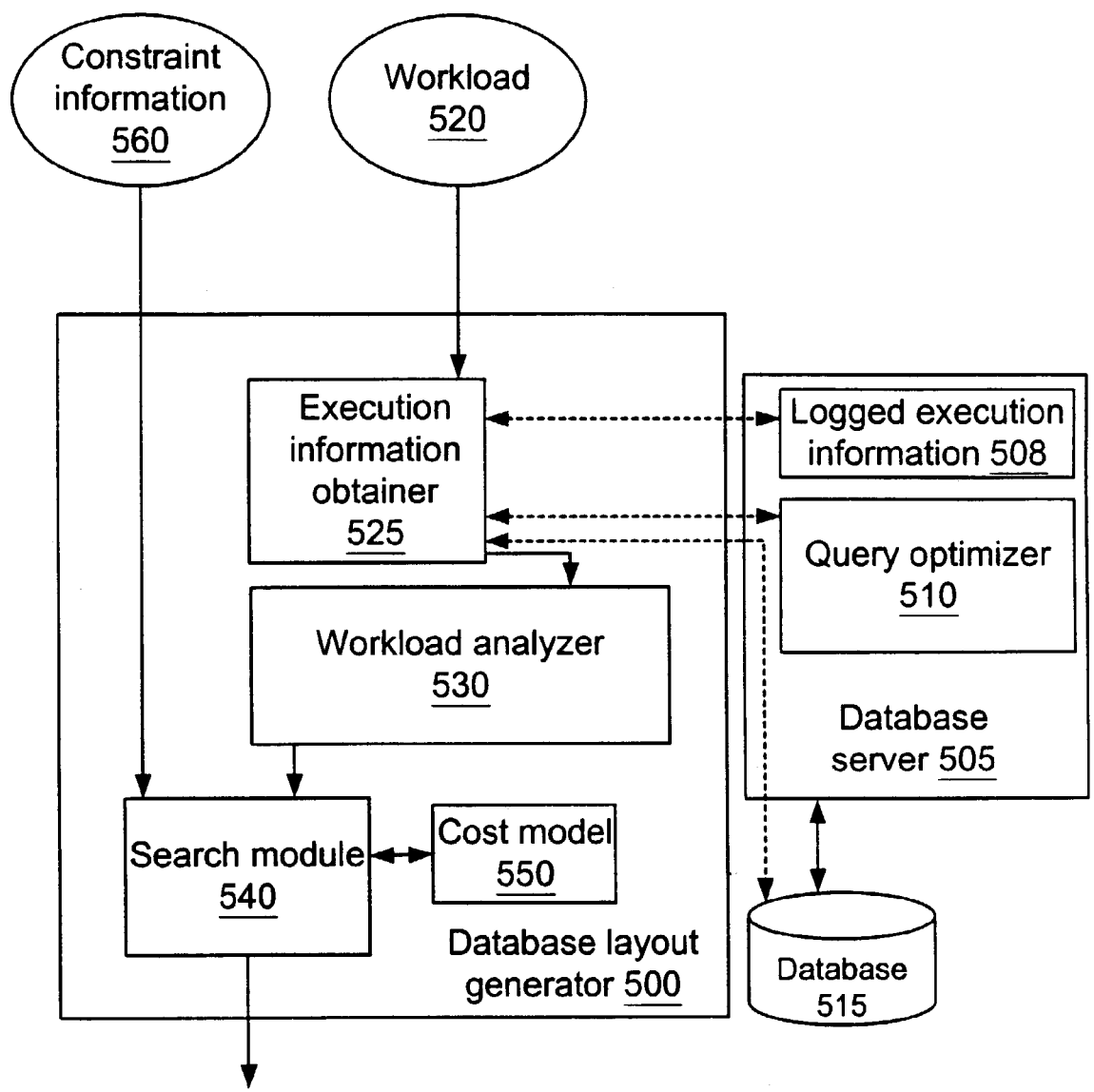
FIG. 5 is a block diagram of a system according to one embodiment of the invention, a database server, and a database.
Figure 6:
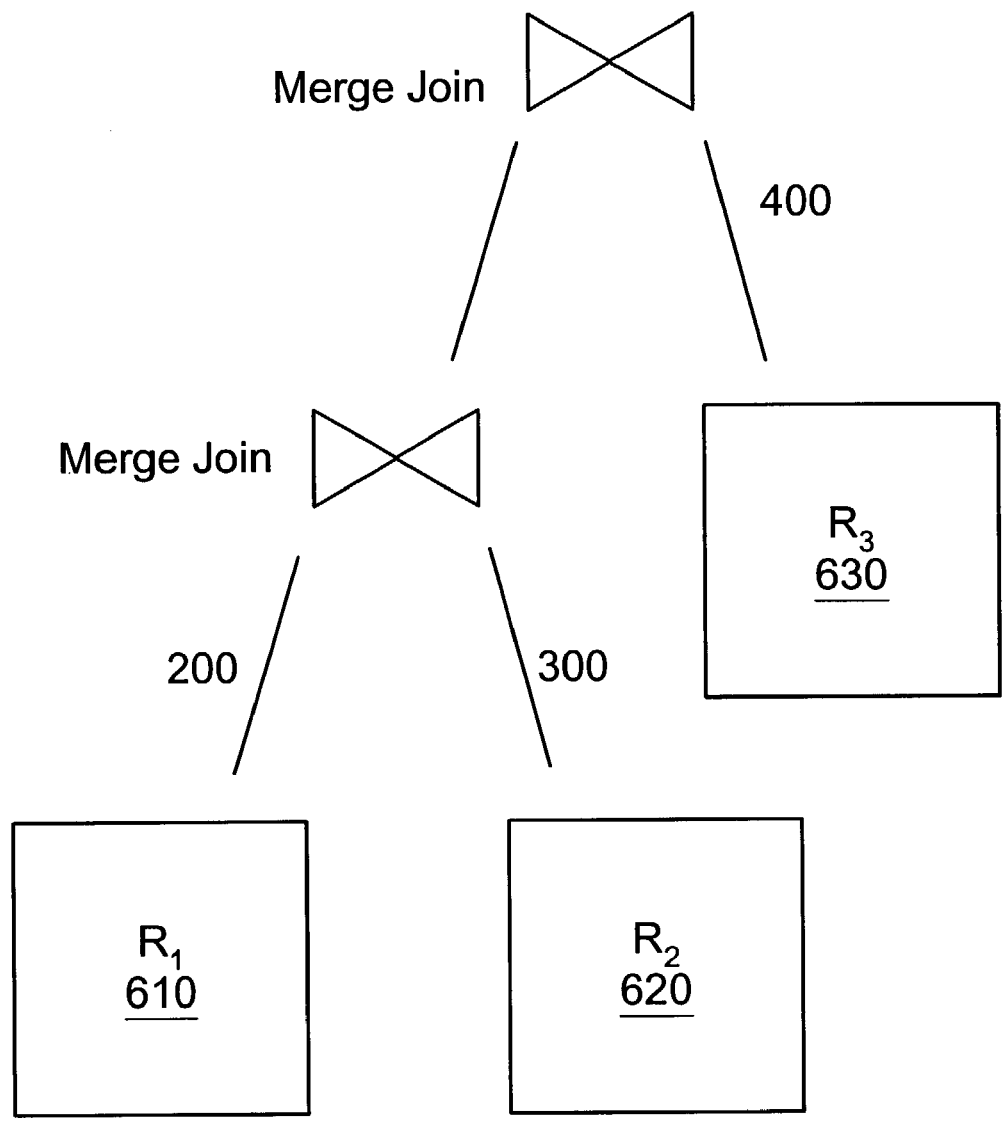
FIG. 6 is a diagram of an execution plan for a first query according to one embodiment of the invention.

Each statement in the workload is assigned a corresponding execution plan. As shown in FIG. 5, a query optimizer 510 located in the database server 505 may be used to obtain this execution plan information. The database 515 is also shown in FIG. 5. The execution information obtainer 525 in the database layout generator 500 receives the workload 520 and obtains execution information. This may be done by optimizing the query using knowledge of the database 515. In other embodiments, this is done by requesting execution plans from the query optimizer 510 or by obtaining stored logged execution information 508. Because database operations may be associative, there may be several execution plans for a given statement. The query optimizer 510 selects an execution plan for use. As shown in FIG. 6, where $R_n$ represents a database object the exemplary statement $Q_1$ shows that a Merge Join is performed on $R_1$ 610 and $R_2$ 620 first, and then the result of that Merge Join is joined again with $R_3$ 630 using Merge Join.

In each query, some or all of the database objects used may be accessed. The amount of each database object accessed will be discussed in blocks, the unit of disk access. However, it is contemplated that other measures of the amount of a database object accessed may be used. For example, query optimizer 510 may provide an estimate of the number of rows of a database object accessed rather than the block size of the database object. (This estimate may not be of distinct blocks accessed, as if a page of an object is accessed more than once, there may be a need to reaccess the page if it is needed again.) Where such estimates are provided, the number of blocks of the object accessed can be determined based on query optimizer 510's estimate of the number of rows of the database object accessed and the estimated average size of each row. Thus, in addition to the order of execution, the execution plan displays the number of blocks of each object accessed. The example execution plan shown in FIG. 6 indicates that 200 blocks of $R_1$ 610 and 300 blocks of $R_2$ 620 are accessed during the first Merge Join, and that 400 blocks of $R_3$ 630 are accessed during the second Merge Join. Information regarding whether accesses are sequential or random may also be provided. Such information (e.g. number of blocks accessed, which blocks are co-accessed, and types of access) constitutes the access information for the query.

Figure 7:
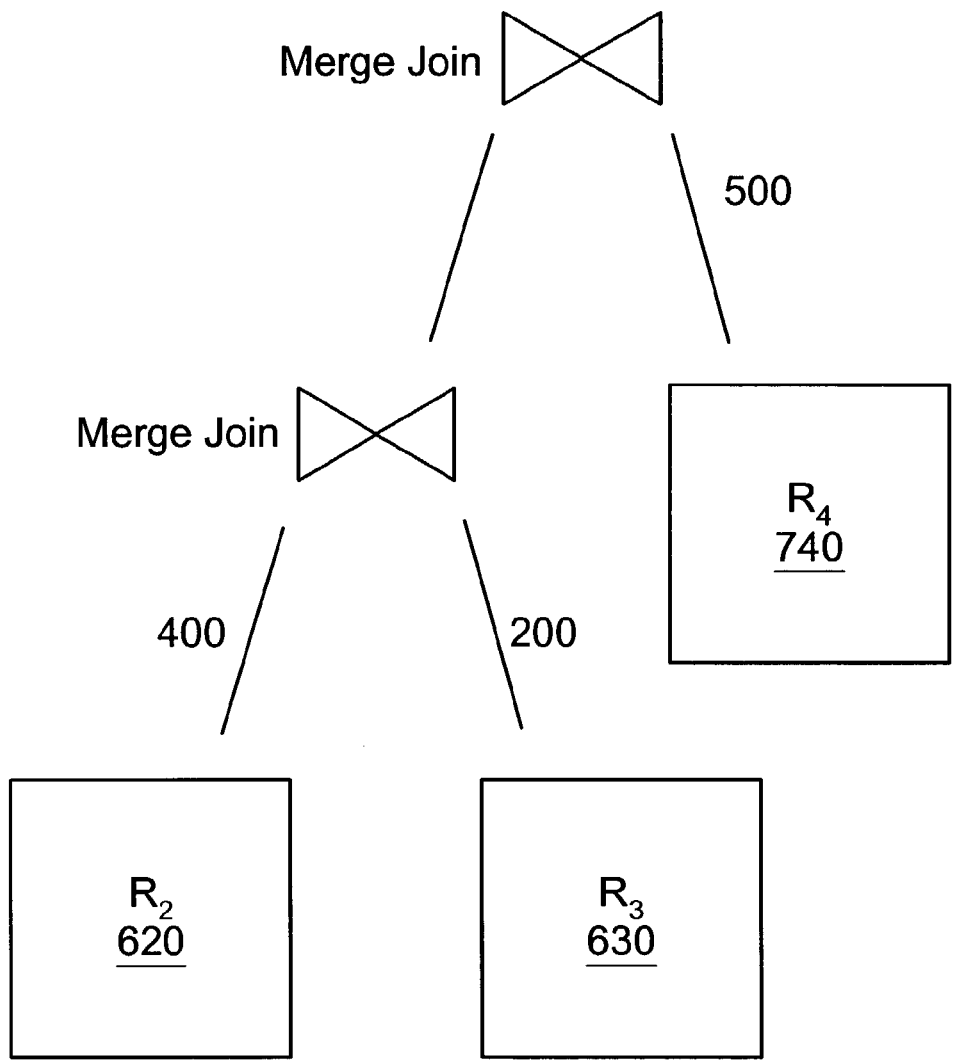
FIG. 7 is a diagram of an execution plan for a second query according to one embodiment of the invention.

As shown in FIG. 7, an example execution plan for the example statement $Q_2$ shows that a Merge Join is performed on $R_2$ 620 and $R_3$ 630 first, and then the result of that Merge Join is Merge Joined with $R_4$ 740. The example execution plan shown in FIG. 7 indicates that 400 blocks of $R_2$ 620 and 200 blocks of $R_3$ 630 are accessed during the first Merge Join, and that 500 blocks of $R_4$ 740 are accessed during the second Merge Join.

While execution plan information has been described, the execution information produced in step 410 need only include access information about the amount of an object accessed in a query, and co-access information about the co-accessing of data in executing the query.

With reference to FIG. 5, when execution information has been determined for statements in the workload, workload analyzer 530 analyzes the workload. With reference to FIG. 4, shown in step 420, where the execution information from step 410 for the workload analyzed to produce cumulative access and co-access information.

There are two key aspects of the workload that affect the choice of database layout. The first is information about which objects are accessed during execution of the workload and total number of blocks accessed for each object. The second aspect is which sets of objects are co-accessed during execution, and the total number of blocks co-accessed. Both of these aspects are referred to as workload information.

In one embodiment, during analysis, workload information is represented as a weighted, undirected graph referred to as an access graph. Each node in the access graph represents an object in the database. Each node has a weight equal to the total number of blocks of that object that is referenced during the execution of all statements in the workload 520. This is access information for the object.

An edge exists between two nodes (representing two database objects) if there are one or more statements in the workload such that both database objects are co-accessed during the execution of the statement. The weight of the edge between the two nodes is the sum, over all statements in the workload, of the total number of blocks of the two database objects co-accessed during the execution of the workload. This is co-access information for the two objects.

Figure 8:
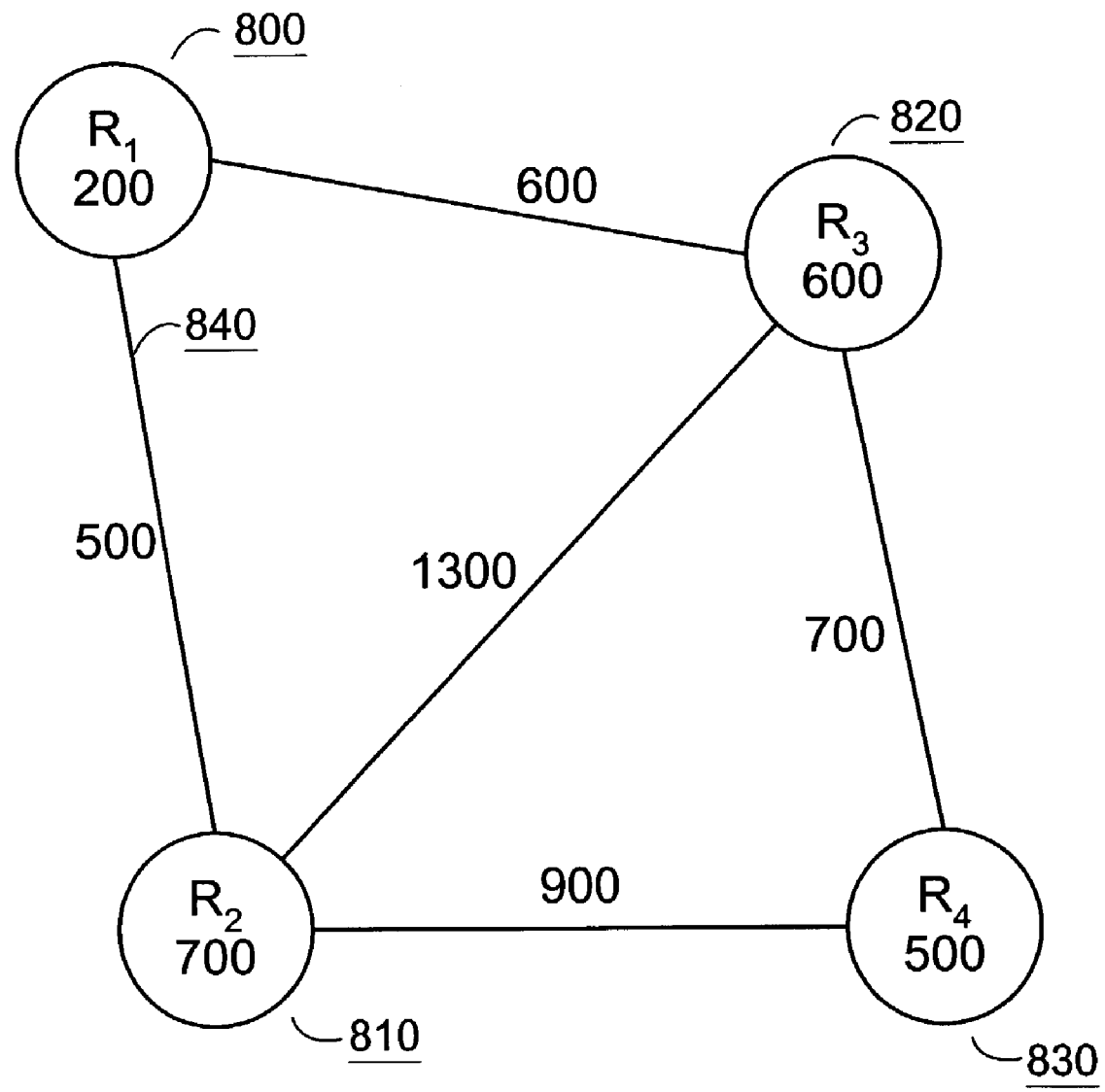
FIG. 8 is a diagram of an access graph for the first and second queries according to one embodiment of the invention.

FIG. 8 shows the access graph for the example queries $Q_1$ and $Q_2$ for which the execution plans are shown in FIGS. 6 and 7. The node representing $R_1$ 800 has a weight of 200, because over both queries, only 200 blocks of $R_1$ are accessed. The node representing $R_2$ 810 has a weight of 700, because over both queries, 700 blocks of $R_2$ are accessed, 300 in the first query and 400 in the second query. Similarly, the node representing $R_3$ 820 has a weight of 600 and the node representing $R_4$ 830 has a weight of 500. The edges have weights representing the sum over both statements of the number of blocks of the two database objects co-accessed during their execution. Therefore, the $R_1$-$R_2$ edge 840 has a weight of 500, because 200 blocks of $R_1$ and 300 blocks of $R_2$ are co-accessed in the first query. The $R_2$-$R_3$ edge 850 has a weight of 1300, because 700 blocks of $R_2$ and $R_3$ are co-accessed in the first query and 600 blocks of $R_2$ and $R_3$ are co-accessed in the second query. Similarly, each remaining edge is assigned a weight based on the number of blocks of the objects represented by the nodes connected by the edges which are co-accessed, summed over all the queries. Because $R_1$ and $R_4$ are not accessed together in either query, no edge is shown between these nodes representing these objects (800 and 830, respectively). Alternatively, this may be thought of as an edge with a weight of 0.

In one embodiment, before workloads are analyzed, each execution plan is broken up into non-blocking sub-plans. Simply because two objects appear in the same execution plan does not imply that they will be co-accessed during the execution of the statement. Although the intent is to determine the weights based on co-accesses of objects, simply adding the number of blocks accessed for different objects in an execution plan may not perfectly reflect co-accesses of the objects. The reason for this is that in many cases, there are blocking operators in the execution plan that ensure that access to one object does not begin until another object is completely accessed. Exemplary blocking operators include the Sort operator.

Figure 9:
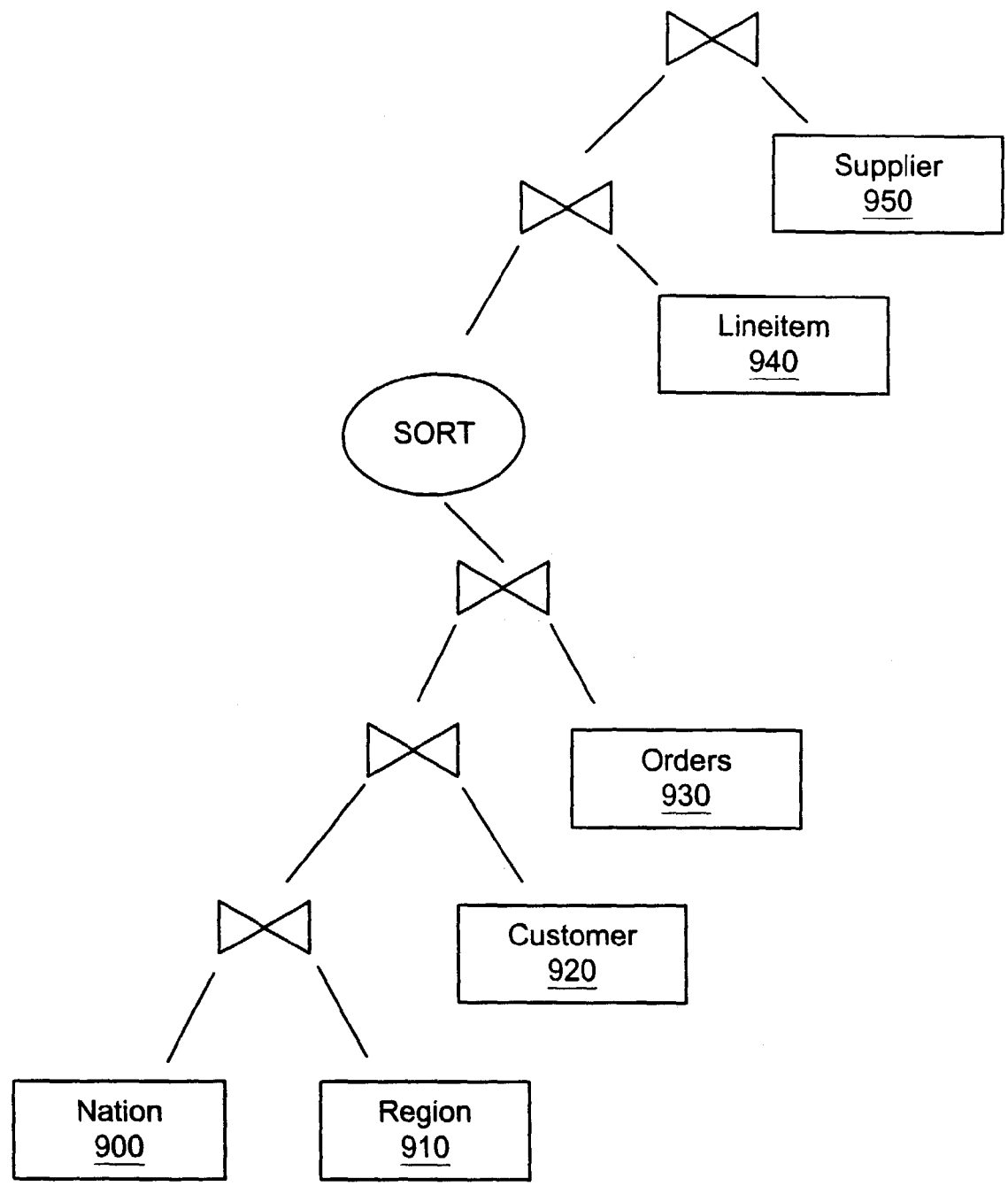
FIG. 9 is a diagram of an execution plan for a query with a blocking operator according to one embodiment of the invention.
Figure 10:
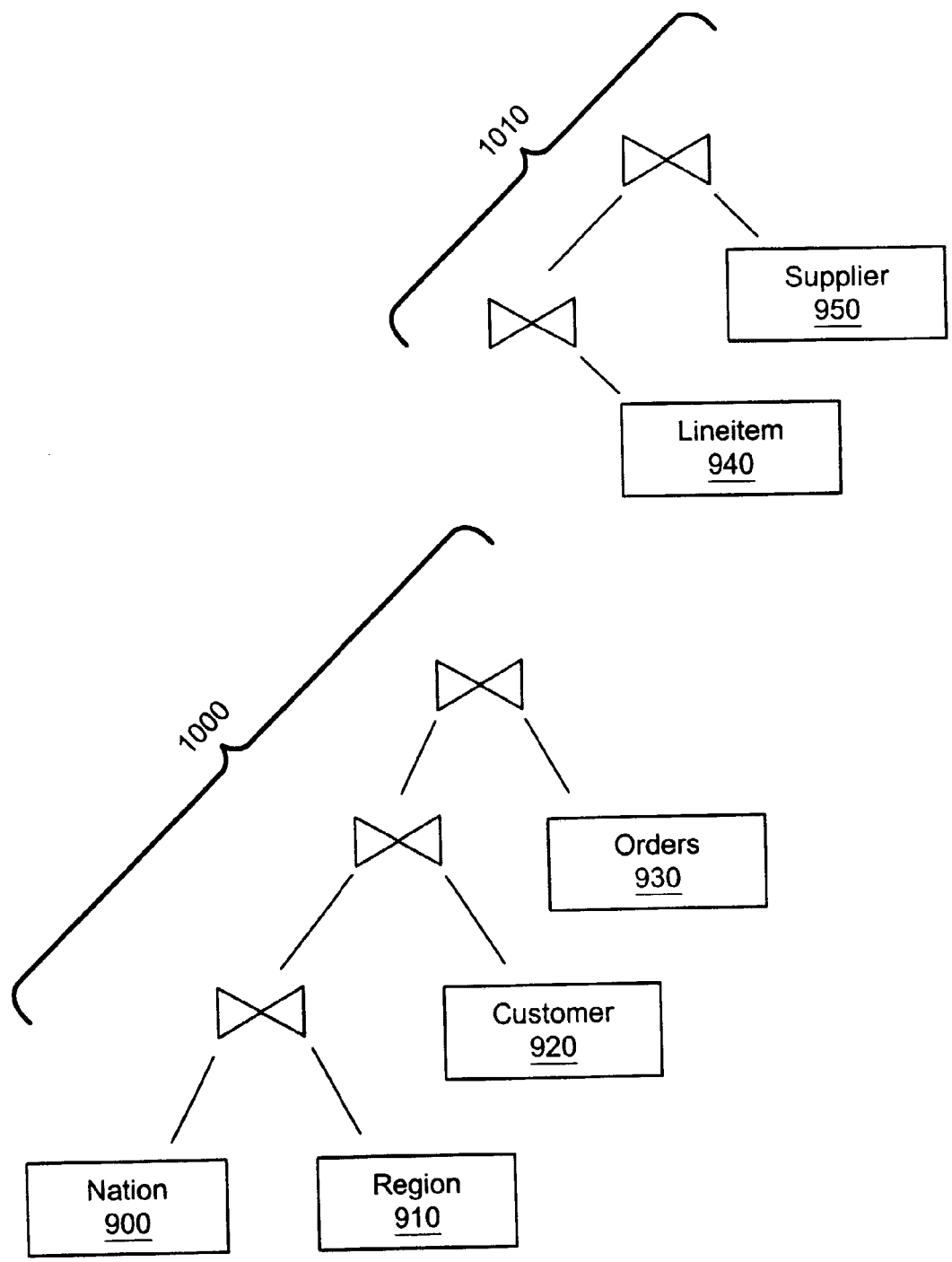
FIG. 10 is a diagram of two non-blocking sub-plans for the query shown in FIG. 9 according to one embodiment of the invention.

As shown in FIG. 9, an execution plan for the TPC-H $Q_5$ benchmark query first joins the database objects Nation 900 and Region 910. Then, this result is joined with Customer 920, and that result is joined with Orders 930. A Sort is performed on that result. The result of this sort is joined with Lineitem 940, and then, finally, that result was joined with Supplier 950. While both database objects Nation 900 and Lineitem 940 are accessed for this query, they are not co-accessed, since the Sort operator is a blocking operator which must conclude before the join using Lineitem 940 occurs. Therefore, as shown in FIG. 10, two non-blocking sub-plans 1000 and 1010 may be created for this query. For queries which do not include the use of blocking operators, the entire query is a non-blocking sub-plan. When constructing an access graph, these non-blocking sub-plans are used to determine node and edge weights, summing over the different non-blocking sub-plans of all the queries.

Producing a Database Layout Recommendation—Evaluating Layouts

With reference again to FIG. 4, in step 430, a search is performed for a preferred layout. With reference to FIG. 5, search module 540 uses the result of the workload analyzer 530 (in one embodiment, an access graph) and applies a cost model 550 and constraint information 560 (if any) to determine, over the space of possible database layouts satisfying the specified constraints the one which has the lowest cost according to the cost model 550, which corresponds to the lowest predicted I/O response time for the analyzed workload 520. Constraint information 560 includes storage information (e.g. for each drive, capacity (e.g. 8 GB), average seek time, average read transfer rate, and average write transfer rate) and other constraints, such as the manageability and availability constraints described above.

Because the aim of this step is to find a database layout that minimizes the total I/O response time over all statements in the workload, any search method that solves this problem will therefore need to compute the I/O response time of statements in the workload for different database layouts.

In selecting a cost model 550, two properties of cost models should be considered. The first property is accuracy. The error incurred in estimating the I/O response time should be as small as possible. Although accuracy in absolute terms is desirable, in general, it is difficult to accurately model the complex behavior of modern disk drives that perform prefetching, I/O reordering etc. Thus, similar to a query optimizer in a RDBMS, in which the goal is to accurately model the relative costs across different execution plans for a given query, the goal is to accurately model the relative I/O response time of a given query across different database layouts.

The second property which should be considered in selecting a cost model is efficiency. The computational overhead of each invocation of the cost model should be small, since the cost model may be invoked many times by the search method.

In one embodiment, for each layout considered in step 430, the workload 520 is actually executed on the database system using the layout. However, this embodiment, where the cost model 550 supplies actual execution information achieves perfect prediction (accuracy) but sacrifices speed and resource usage (efficiency). In another embodiment, instead, a cost model 550 estimates the I/O response time for a given query and database layout, without physically altering the layout or executing the query. While the query optimizer 510 may include a cost estimate for a query, it is not effective to use the query optimizer's cost estimates for this purpose, because query optimizers are insensitive to database layout, and therefore this cost will not vary among the different layouts considered.

In one embodiment, the cost model estimates, for a given query and layout, the response time for the slowest disk drive to return a response on the query. This response time will be the limiting factor for the I/O response to the query. The actual execution time for the query may be different, because it depends on the CPU time as well as I/O response time for the query. Other factors, including buffering, concurrent execution, and access of objects in a temporary database (such as tempdb) can also affect actual execution time.

In one embodiment, the cost model estimates a transfer cost and a seek cost for each disk drive involved in the query, and returns the highest value for the sum of the transfer cost and the seek cost found among all the drives. In one embodiment, the seek time represents the time to position the disk arm onto the appropriate cylinder and bring the appropriate sector on the cylinder under the head. The transfer time represents the time taken to read (or write) the requested data once the arm and the head are in the appropriate position. The average transfer rate may be determined using any disk calibration tool or from the disk manufacturer specifications.

In another embodiment, the cost model computes the slowest response by any disk drive to each non-blocking sub-plan of the query and adds these to calculate the estimated cost for the query.

In one embodiment, a cost model functions to estimate the I/O response time Cost for a given query, execution plan, and layout according to the following pseudo code, in which $R_n$ refers to one of the N database objects; $D_m$ refers to one of the M disk drives; $x_{ij}$ refers to the fraction of object $R_i$ that is stored on drive $D_j$; $B(|R_i|,P)$ is the number of blocks of $R_i$ accessed in P; $T_j$ is the transfer rate (either the read transfer rate or the write transfer rate, depending on whether data is being read or written) of disk drive $D_j$; and $S_j$ is the average seek time of disk drive $D_j$:

```
Cost = 0
For each non-blocking sub-plan P of the execution plan
    MaxCost = 0
    For each disk drive D_j
        TransferCost = Σ_i x_ij * B (|R_i|, P) / T_j (where the
            summation is taken over an object R_i if and only
            if R_i is accessed in P)
        Let k be the number of database objects on D_j
            accessed in P
        If k > 1
            Then SeekCost = k * S_j* min_i (x_ij * B (|R_i|, P) )
            (where the minimum is taken over all objects
            R_i that are accessed in P)
            Else SeekCost = 0
        End If
        If (TransferCost + SeekCost) > MaxCost
            Then MaxCost = (TransferCost + SeekCost)
        End If
    End For
    Set Cost += MaxCost
End For
Return Cost
```

Thus, the seek time is modeled by assuming that on average all objects that are co-accessed on a disk drive in a given non-blocking sub-plan are accessed at a rate proportional to the number of blocks accessed of each object. For example, if on a given disk drive, ten blocks of object A and twenty blocks of object B are co-accessed, then the prediction is based on the assumption that on average, after accessing each block of object A, a seek is necessary to access two blocks of B, followed by a seek to access one more block of object A, etc. If only one object on a disk is being accessed in a non-blocking sub-plan, no seek time is necessary. This model is reasonable for most binary relational operators such as Nested Loops Join and Merge Join, as well as plans involving index seek followed by table lookup.

As an example, for the query "SELECT*FROM A, B WHERE A.a=B.b" an execution plan of this query might show that the object A (consisting of three hundred blocks) and object B (consisting of one hundred and fifty blocks) are scanned together (e.g., in a Merge Join operator). The objects A and B must be stored on one or more of three identical disk drives $D_1$, $D_2$, $D_3$ with transfer rate T and average seek time S. A first layout $L_1$ has both objects distributed evenly with a portion of each on each of the three drives. This is the full striping layout. Thus each disk drive contains one hundred blocks of A and fifty blocks of B. The estimated transfer time on each disk drive is therefore the number of blocks transferred (one hundred fifty) divided by the transfer rate T. The estimated seek time is equal to two (the number of objects) times S (the average seek time) times fifty (the smallest number of blocks stored on the drive for any database objects stored on the drive). The sum of the estimated transfer time and the estimated seek time is the total estimated I/O response time, which is given in equation 1:

$$\text{Total estimated response time for } L_1 = 150/T + 100*S \qquad [1]$$

In another exemplary layout $L_2$, A is divided between $D_1$ and $D_2$ and B between $D_2$ and $D_3$. Thus $D_1$ and $D_2$ each contain one hundred fifty blocks of A, and $D_2$ and D3 each contain seventy-five blocks of B. When determining the costs, $D_2$ is the bottleneck disk drive for the query and its total estimated I/O response time is given in equation 2:

$$\text{Total estimated response time for } L_2=(150+75)/T+ \\ 2*75*S=225/T+150*S \qquad [2]$$

It can be seen that this is a higher cost than that for $L_1$ in equation [3] by subtracting the total estimated response time for $L_1$ from the total estimated response time for $L_2$:

$$\text{Total estimated response time for } L_2 - \text{Total estimated} \\ \text{response time for } L_1 = (225/T+150*S) - (150/T+ \\ 100*S) = 75/T+50*S \qquad [3]$$

In a third exemplary layout $L_3$ however, $D_1$ and $D_2$ each contain one hundred fifty blocks of A, and $D_3$ contains one hundred fifty blocks of B. Since there is no seek time on any of the disks and all disks contain the same number of blocks to be accessed by the query, the total estimated I/O response time of the query is one hundred fifty divided by T. This is the transfer time needed for $L_1$ with no seek time costs. Therefore, for the above query, layout $L_3$ is better than layout $L_1$, which in turn is better than layout $L_2$.

Producing a Database Layout Recommendation—Producing Layout Possibilities

As previously discussed, with reference again to FIG. 4, in step 430, a search is performed for a preferred layout. In embodiments in which the cost model 550 takes into account transfer time and seek time, such as the cost model described above in pseudocode, finding the optimal layout for the cost model and workload may be computationally hard. Therefore, while in one embodiment, the problem is solved by brute force, it is expected that all such solutions will be in non-polynomial time. The cost function to be optimized is also non-linear, and generic search techniques for solving non-linear optimization problems tend to be computationally expensive.

As in the determination of a cost model, a balance between efficiency and accuracy must be struck. In one embodiment, domain knowledge is leveraged to develop a scalable heuristic solution in two steps. The first step obtains an initial valid database layout that attempts to minimize the co-location of objects that are co-accessed in the workload. The second step improves the initial solution by attempting to increase the I/O parallelism of objects possibly at the expense of increased seek cost.

Figure 11:
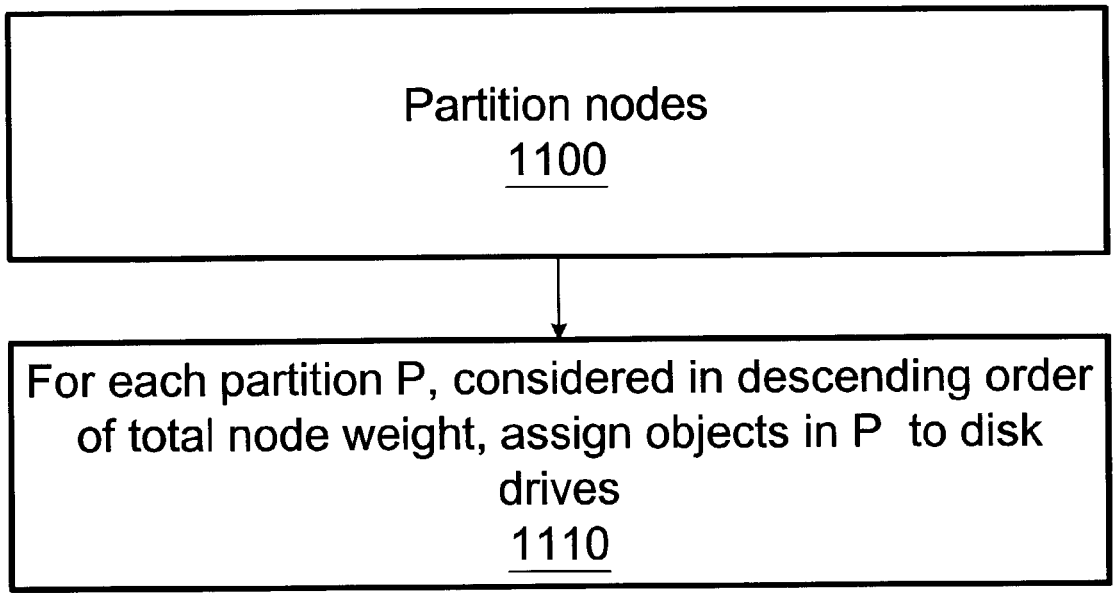
FIG. 11 is a flow diagram illustrating obtaining an initial layout according to one embodiment of the invention.

In one embodiment, the first step can be described as follows, as shown in FIG. 11, where m is the number of disk drives:

Sub-step 1100: Partition nodes—partition nodes in the access graph into m partitions using a graph partitioning algorithm so as to maximize the sum of edge weights across partitions.

Sub-step 1110: For each partition P considered in descending order of total node weight, assign objects in P to the smallest set of disk drive(s) ordered by decreasing transfer rate that can (a) hold the objects in the partition (b) is disjoint from the disk drives to which previous partitions have been assigned.

In sub-step 1110, if a disjoint set of disk drive(s) does not exist, find a previously assigned partition P' such that sum of edge weights between P and P' is smallest, and assign P to same set of disk drives as P'.

This produces an initial solution with the aim of minimizing the amount of co-location of objects that are co-accessed in the workload. This is because the problem of partitioning the nodes of the access graph into a given number of partitions such that the sum of the weights of edges that connect nodes in different partitions (the total weight of the edge "cut set") is maximized. Intuitively, this partitioning places in one partition objects that are rarely or never co-accessed together. This is equivalent to the graph partitioning problem which known to be NP-Complete. However, many efficient heuristic solutions to the problem exist. In one embodiment, the Kernighan-Lin algorithm (described in Kernighan B., Lin S. "An efficient heuristic procedure for partitioning graphs." *The Bell System Technical Journal*, 1970) is used to perform this partitioning. Objects in one partition are allocated on the same disk drive or drives.

In one embodiment, as described above, the number of partitions created in sub-step 1100 is equal to m, the number of disk drives available. Increasing the number of partitions above the number of disk drives would not further improve co-location of co-accessed objects. However, in other embodiments, the number of partitions created in sub-step 1100 is greater than or less than m.

Figure 12:
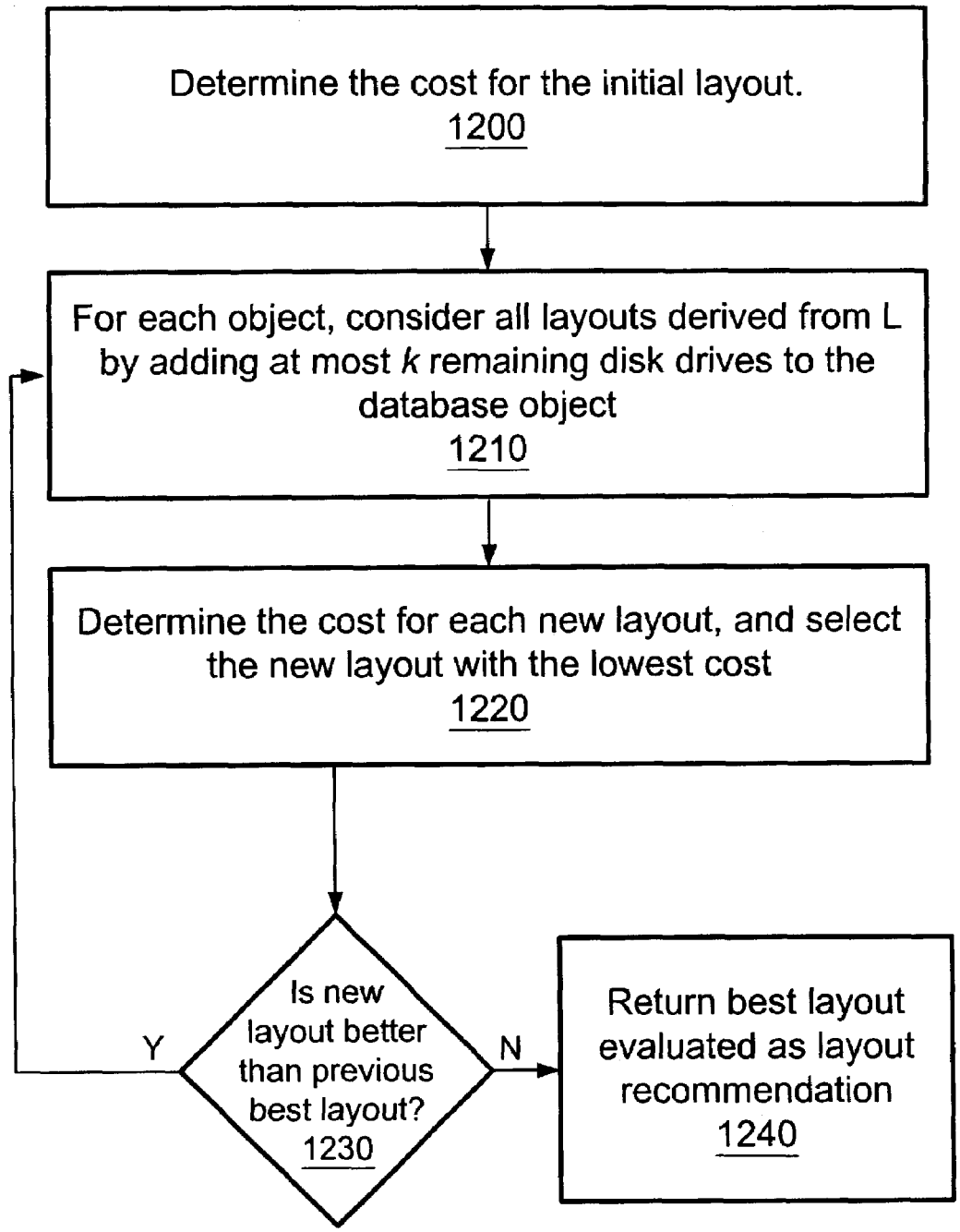
FIG. 12 is a flow diagram illustrating improving the initial layout according to one embodiment of the invention.

The second step of the scalable heuristic solution according to one embodiment can be described as follows, starting from an initial layout (in one embodiment, this initial layout is the layout obtained from the method described above with reference to FIG. 11) with reference to FIG. 12, where k is a prespecified number:

Sub-step 1200: Determine the cost for the initial layout, setting C=that cost and L=that initial layout. This may be done by summing the cost for each query over all queries in the workload. In one embodiment, each query is assigned a weight, and what is summed in this step is, for each query, the weight assigned to the query multiplied by the cost of the query.

Sub-step 1210: For each database object, consider all layouts derived from L by adding at most k of the remaining disk drives (on which the object is not already allocated) to the object. In one embodiment, to create each new layout, the object is allocated across the disk drives chosen for that object in the ratio of the transfer rate of the chosen disk drives. In an alternate embodiment, for each new layout, the object is allocated across the disk drives by considering one or more of: the transfer rates for the disk drives, seek times for the disk drives, capacity for the disk drives, manageability constraints, availability constraints, and current amount of data assigned to the disk drives.

Sub-step 1220: Determine the cost for each new layout, and select the new layout with the lowest cost.

Sub-step 1230: If the cost C' of a new layout L' is lower than the cost C of layout L, set L=L', C=C' and go to sub-step 1210.

Sub-step 1240: Return L as the layout recommendation.

This second step proceeds iteratively, improving the solution obtained in the first step by attempting to increase parallelism of objects. In each iteration, an attempt is made to increase parallelism of each database object by at most k additional disk drives on which the object is not already allocated. Intuitively, the parameter k controls how exhaustive this step of the search is. At the end of the iteration (sub-step 1230), the layout that reduces the cost of the workload the most is chosen as the starting point for the next iteration. The algorithm terminates (sub-step 1240) when it encounters an iteration in which a layout with lower cost of the workload is not found.

For an object which has little or no co-access with other objects, this "greedy" strategy will eventually allocate sufficient (possibly all) disk drives and will thereby achieve good parallelism for that object (similar to Full Striping of the object over the disk drives). However, since this second step proceeds by finding possible alternatives related to an initial layout, (and due to its "greedy" nature), it is possible that the algorithm will get stuck in a local minimum. This is because when the number of disk drives on which two co-accessed objects are co-located goes from 0 to 1, the cost of the query can increase significantly (due to increased seek cost), but as the number of disk drives on which the objects are co-located then increases beyond 1, the cost can decrease (below the cost for the no overlap case) due to decreased transfer cost. Again, a balance between efficiency and accuracy must be struck. In one embodiment, k=1. In other embodiments, k>1. This may provide increased accuracy at the expense of efficiency.

Conclusion

The programming necessary to effectuate the structures of the present invention and the processes performed in connection with the present invention is relatively straightforward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism that uses workload information to provide database layout recommendations. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed:

1. A method for generating a database layout for a database comprising at least one database object and at least one storage object, said method comprising the steps of:
   determining execution information for at least one query from a workload comprising the at least one query;
   analyzing said execution information to produce cumulative access and co-access information from said at least one database object by producing access graph information comprising,
   for each database object in said database, a node with a node weight value corresponding to the sum, over each query in said workload, of the amount of said database object accessed in said query, and,
   for each pair of said nodes, an edge with an edge weight value corresponding to the sum, over each query in said workload, of the amount of a pair of database objects corresponding to said pair of said nodes co-accessed in said query; and
   automatically generating a database layout for the at least one storage object using said cumulative access and co-access information.

2. The method of claim 1, where said at least one query comprises queries previously executed on said database.

3. The method of claim 1, where said workload comprises testing queries.

4. The method of claim 1, where said step of determining execution information for at least one query comprises using a query optimizer to produce an execution plan.

5. The method of claim 1, where said step of analyzing said execution information to produce cumulative access and co-access information from said at least one database object comprises:
   producing access graph information comprising, for each database object in said database the sum, over each query in said workload, of the amount of said database object accessed in said query; and for each pair of said database objects, the sum, over each query in said workload, of the amount of said pair of database objects co-accessed in said query.

6. The method of claim 1, where said step of analyzing said execution information to produce cumulative access and co-access information from said at least one database object further comprises:
   breaking at least one of said queries into two or more non-blocking sub-plans; and
   where said step of producing access graph information comprises using said non-blocking sub-plans in determining said node weight and edge weight values.

7. The method of claim 6, where said non-blocking sub-plans contain no database objects acted upon by blocking operators.

8. The method of claim 6, where said step of generating a database layout using said cumulative access and co-access information comprises: determining a cost for a database layout being evaluated.

9. The method of claim 8, where said step of determining a cost for a database layout being evaluated comprises:
   summing over each non-blocking sub-plan in said workload an overall estimated time to execute said non-blocking sub-plan.

10. The method of claim 9, where said step of determining a cost for a database layout being evaluated further comprises:
    calculating for each non-blocking sub-plan in said workload the estimated storage object response time for each of said storage objects to respond to said non-blocking sub-plan; and where said overall estimated time to execute said non-blocking sub-plan comprises the largest of said estimated storage object response times for said non-blocking sub-plan.

11. The method of claim 10, where said estimated storage object response time comprises an estimated transfer cost for said storage object and said non-blocking sub-plan and an estimated seek cost for said storage object for said non-blocking sub-plan.

12. The method of claim 11, where said estimated transfer cost for said storage object and said non-blocking sub-plan comprises the sum, over all database objects accessed in said non-blocking sub-plan, of the product of the fraction of said database object stored on said storage object and the number of blocks of said storage object accessed in said non-blocking sub-plan divided by a transfer rate for said database object.

13. The method of claim 1, where said step of generating a database layout using said cumulative access and co-access information comprises: determining a cost for a database layout being evaluated.

14. The method of claim 13, where said step of determining a cost for a database layout being evaluated comprises:
summing over each query in said workload an overall estimated time to execute said query.

15. The method of claim 14, where said step of determining a cost for a database layout being evaluated further comprises:
calculating for each query in said workload the estimated storage object response time for each of said storage objects to respond to said query; and where said overall estimated time to execute said query comprises the largest of said estimated storage object response times for said query.

16. The method of claim 15, where said estimated storage object response time comprises an estimated transfer cost for said storage object and said query and an estimated seek cost for said storage object for said query.

17. The method of claim 16, where said estimated transfer cost for said storage object and said query comprises the sum, over all database objects accessed in said query, of the product of the fraction of said database object stored on said storage object and the number of blocks of said storage object accessed in said query divided by a transfer rate for said database object.

18. The method of claim 16, where said estimated seek cost for said storage object and said query comprises the product of:
the minimum over all database objects of the product of the fraction of said database object stored on said storage object and the number of blocks of said storage object accessed in said query;
a seek time for said storage object; and
the number of database objects on said storage objects accessed in said query.

19. The method of claim 1, where said step of generating a database layout using said cumulative access and co-access information comprises: determining an initial database layout option;
determining a second database layout option; and
determining whether said second database layout option is an improvement over said initial database layout option.

20. The method of claim 19, where said step of determining an initial database layout option comprises:
partitioning said access graph into m partitions, wherein m is a positive integer, using a graph partitioning algorithm so as to maximize the sub of said edge weight values across partitions; and
for each partition, assigning each of said database objects represented in said partition to the smallest set of said storage objects ordered by decreasing transfer rate that (a) can contain said database objects and (b) is disjoint from storage objects previously assigned, if such a set can be identified.

21. The method of claim 20, where said step of determining an initial database layout option comprises:
where said set can not be identified, determining a previously assigned partition where a sum of said edge weights between said partition and said previously assigned partition is minimized, and assigning each of said database objects represented in said partition to storage objects assigned to said previously assigned partition.

22. The method of claim 20, where m is equal to the number of said at least one storage object.

23. The method of claim 19, where said step of determining a second database layout option comprises:
for each database object, evaluating all layouts derived from said initial database layout option by adding at most k of said at least one storage objects to said database objects, where k is a positive integer; and
determining which of said evaluated layouts has a smallest estimated cost and using that as said second database layout option.

24. The method of claim 19, where said step of generating a database layout using said cumulative access and co-access information comprises:
if said second database layout option is not an improvement over said initial database option, recommending said initial database layout option; and
if said second database layout option is an improvement over said initial database option, iteratively determining a new database layout option until said new database layout option is not an improvement over a previously determined best database layout option.

25. A computer-readable storage medium having stored thereon instructions executing on a computer for generating a database layout for a database comprising at least one database object and at least one storage object, to perform the steps of:
determining execution information for at least one query from a workload comprising the at least one query;
analyzing said execution information to produce cumulative access and co-access information from said at least one database object by producing access graph information comprising,
for each database object in said database, a node with a node weight value corresponding to the sum, over each query in said workload, of the amount of said database object accessed in said query, and
for each pair of said nodes, an edge with an edge weight value corresponding to the sum, over each query in said workload, of the amount of a pair of database objects corresponding to said pair of said nodes co-accessed in said query; and
automatically generating a database layout using said cumulative access and co-access information.

26. The computer-readable storage medium of claim 25, where said at least one query comprises queries previously executed on said database.

27. The computer-readable storage medium of claim 25, where said workload comprises testing queries.

28. The computer-readable storage medium of claim 25, where said computer executable instructions for determining execution information for at least one query comprises computer executable instructions for using a query optimizer to produce an execution plan.

29. The computer-readable storage medium of claim 25, where said computer executable instructions for analyzing said execution information to produce cumulative access and co-access information from said at least one database object comprise:

computer executable instructions for producing access graph information comprising, for each database object in said database the sum, over each query in said workload, of the amount of said database object accessed in said query; and for each pair of said database objects, the sum, over each query in said workload, of the amount of said pair of database objects co-accessed in said query.

30. The computer-readable storage medium of claim 25, where said computer executable instructions for analyzing said execution information to produce cumulative access and co-access information from said at least one database object further comprise:

computer executable instructions for breaking at least one of said queries into two or more non-blocking sub-plans; and where said computer executable instructions for producing access graph information comprise computer executable instructions for using said non-blocking sub-plans in determining said node weight and edge weight values.

31. The computer-readable storage medium of claim 30, where said non-blocking sub-plans contain no database objects acted upon by blocking operators.

32. The computer-readable storage medium of claim 30, where said computer executable instructions for generating a database layout using said cumulative access and co-access information comprise:

computer executable instructions for determining a cost for a database layout being evaluated.

33. The computer-readable storage medium of claim 32, where said computer executable instructions for determining a cost for a database layout being evaluated comprise:

computer executable instructions for summing over each non-blocking sub-plan in said workload an overall estimated time to execute said non-blocking sub-plan.

34. The computer-readable storage medium of claim 33, where said computer executable instructions for determining a cost for a database layout being evaluated further comprise:

computer executable instructions for calculating for each non-blocking sub-plan in said workload the estimated storage object response time for each of said storage objects to respond to said non-blocking sub-plan; and where said overall estimated time to execute said non-blocking sub-plan comprises the largest of said estimated storage object response times for said non-blocking sub-plan.

35. The computer-readable storage medium of claim 34, where said estimated storage object response time comprises an estimated transfer cost for said storage object and said non-blocking sub-plan and an estimated seek cost for said storage object for said non-blocking sub-plan.

36. The computer-readable storage medium of claim 35, where said estimated transfer cost for said storage object and said non-blocking sub-plan comprises the sum, over all database objects accessed in said non-blocking sub-plan, of the product of the fraction of said database object stored on said storage object and the number of blocks of said storage object accessed in said non-blocking sub-plan divided by a transfer rate for said database object.

37. The computer-readable storage medium of claim 25, where said computer executable instructions for generating a database layout using said cumulative access and co-access information comprise:

computer executable instructions for determining a cost for a database layout being evaluated.

38. The computer-readable storage medium of claim 37, where said computer executable instructions for determining a cost for a database layout being evaluated comprise:

computer executable instructions for summing over each query in said workload an overall estimated time to execute said query.

39. The computer-readable storage medium of claim 38, where said computer executable instructions for determining a cost for a database layout being evaluated further comprise:

computer executable instructions for calculating for each query in said workload the estimated storage object response time for each of said storage objects to respond to said query; and where said overall estimated time to execute said query comprises the largest of said estimated storage object response times for said query.

40. The computer-readable storage medium of claim 39, where said estimated storage object response time comprises an estimated transfer cost for said storage object and said query and an estimated seek cost for said storage object for said query.

41. The computer-readable storage medium of claim 40, where said estimated transfer cost for said storage object and said query comprises the sum, over all database objects accessed in said query, of the product of the fraction of said database object stored on said storage object and the number of blocks of said storage object accessed in said query divided by a transfer rate for said database object.

42. The computer-readable storage medium of claim 40, where said estimated seek cost for said storage object and said query comprises the product of:

the minimum over all database objects of the product of the fraction of said database object stored on said storage object and the number of blocks of said storage object accessed in said query;

a seek time for said storage object; and the number of database objects on said storage objects accessed in said query.

43. The computer-readable storage medium of claim 27, where said computer executable instructions for generating a database layout using said cumulative access and co-access information comprise:

computer executable instructions for determining an initial database layout option;

computer executable instructions for determining a second database layout option; and computer executable instructions for determining whether said second database layout option is an improvement over said initial database layout option.

44. The computer-readable storage medium of claim 43, where said computer executable instructions for determining an initial database layout option comprise:

computer executable instructions for partitioning said access graph into m partitions, where m is a positive integer, using a graph partitioning algorithm so as to maximize the sum of said edge weight values across partitions; and computer executable instructions for, for each partition, assigning each of said database objects represented in said partition to the smallest set of said storage objects ordered by decreasing transfer rate that (a) can contain said database objects and (b) is disjoint from storage objects previously assigned, if such a set can be identified.

45. The computer-readable storage medium of claim. 47, where said computer executable instructions for determining an initial database layout option comprise:

computer executable instructions for, where said set can not be identified, determining a previously assigned partition where a sum of said edge weights between said partition and said previously assigned partition is minimized, and assigning each of said database objects represented in said partition to storage objects assigned to said previously assigned partition.

46. The system of claim 44, where m is equal to the number of said at least one storage object.

47. The computer-readable storage medium of claim 43, where said computer executable instructions for determining a second database layout option comprise:

computer executable instructions for, for each database object, evaluating all layouts derived from said initial database layout option by adding at most k of said at least one storage objects to said database object, where k is a positive integer; and computer executable instructions for determining which of said evaluated layouts has a smallest estimated cost and using that as said second database layout option.

48. The computer-readable storage medium of claim 43, where said computer executable instructions for generating a database layout using said cumulative access and co-access information comprise:

computer executable instructions for, if said second database layout option is not an improvement over said initial database option, recommending said initial database layout option; and computer executable instructions for, if said second database layout option is an improvement over said initial database option, iteratively determining a new database layout option until said new database layout option is not an improvement over a previously determined best database layout option.

\* \* \* \* \*